United States Patent [19]

Oliveri

[11] 3,739,877

[45] June 19, 1973

[54] GREASE CUP

[75] Inventor: Paul B. Oliveri, Houston, Tex.

[73] Assignee: Industrial Specialties Corporation, Englewood, N.J.

[22] Filed: Nov. 9, 1971

[21] Appl. No.: 197,067

[52] U.S. Cl............ 184/45 R, 92/98 D, 184/105 R
[51] Int. Cl............................................. F16n 11/04
[58] Field of Search................ 184/14, 39, 45, 46, 184/45 A, 105 R; 277/207, 211; 308/72; 92/98 R, 98 D

[56] References Cited
UNITED STATES PATENTS

| | | | |
|---|---|---|---|
| 2,985,256 | 5/1961 | Simmons et al................... | 184/45 R |
| 2,942,624 | 6/1960 | Good.............................. | 92/98 R X |
| 3,351,088 | 11/1967 | Jensen............................. | 92/98 R X |
| 1,027,768 | 5/1912 | Roby............................... | 92/98 D |
| 1,712,361 | 5/1929 | Soderquist..................... | 220/39 C X |
| 3,297,049 | 1/1967 | Moskovitz....................... | 277/207 X |
| 3,659,675 | 5/1972 | Edelstein et al..................... | 184/39 |
| 2,588,026 | 3/1952 | Martin.................................. | 184/14 |
| 2,857,020 | 10/1958 | Otto................................... | 184/45 R |
| 2,498,090 | 2/1950 | MacIndoe........................ | 184/45 R |

Primary Examiner—Manuel A. Antonakas
Attorney—Wm. T. Wofford, Robert Felsman

[57] ABSTRACT

A lubricating device for automatically feeding lubricant from a reservoir to an element such as a bearing, characterized by a hollow housing having a lubricant injection fitting and relief valve for controlled filling, being connectable with the element by way of an axial lubricant discharge passageway, and having an annular sealing shoulder with anti-slip means for retaining a flange of a diaphragm in place; a distensible elastic diaphragm having a peripheral sealing flange seated on said annular sealing shoulder; an annular threaded ring that threadedly engages the internal threaded wall of the housing for being screwed inwardly to compressively retain the peripheral sealing flange of the diaphragm against the annular sealing shoulder independently of any guard element; and a rigid guard element disposed about the diaphragm for protection. Also disclosed are preferred embodiments wherein the lubricating device is provided with a slip-off cover; an externally adjustable flow control valve; an indicator means for indicating the degree of fill of the diaphragm; and a guard element that threadedly engages the threaded wall of the housing but is shorter than in the prior art so as to allow independent adjustment of the threaded annular ring.

4 Claims, 5 Drawing Figures

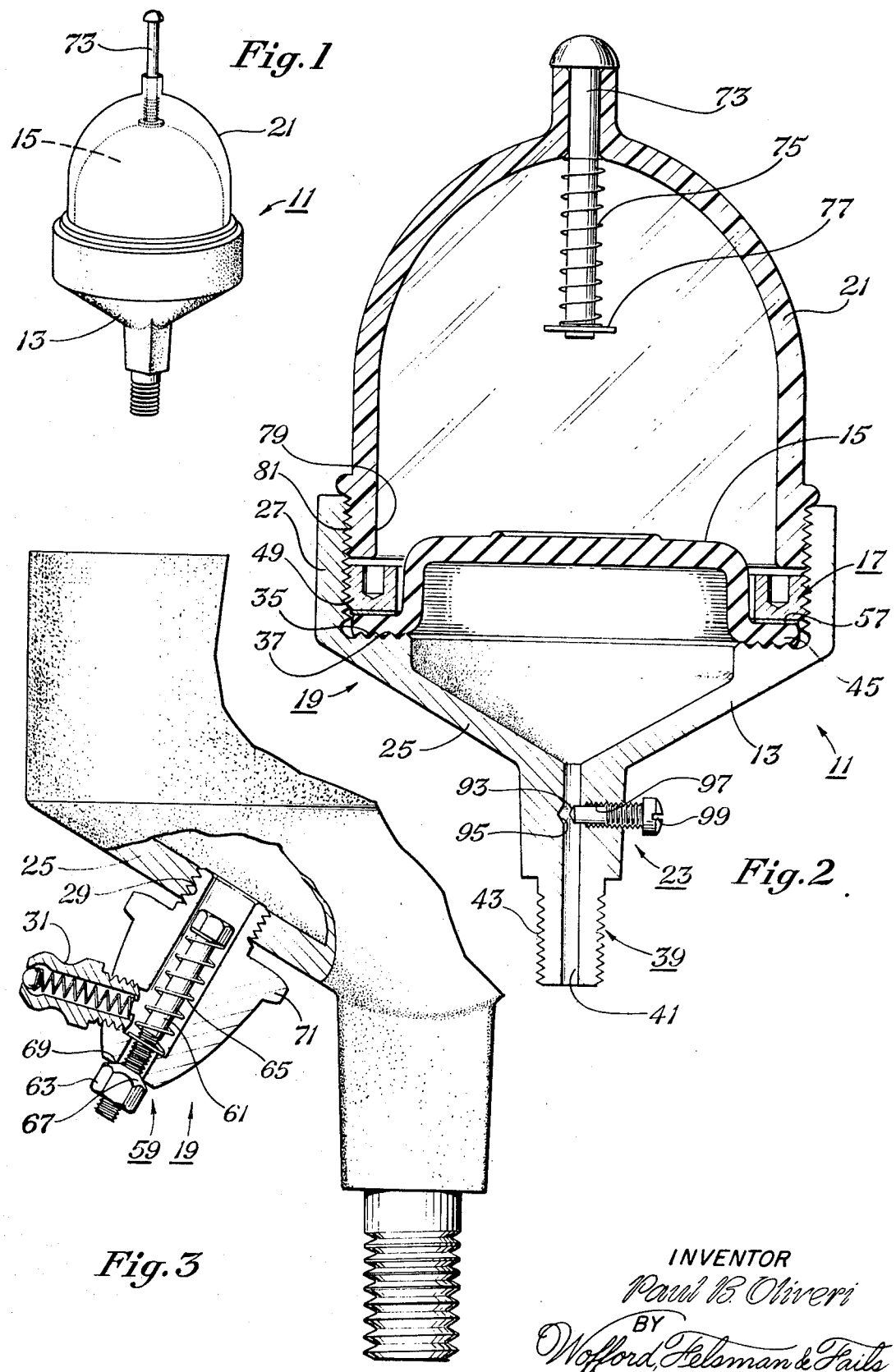

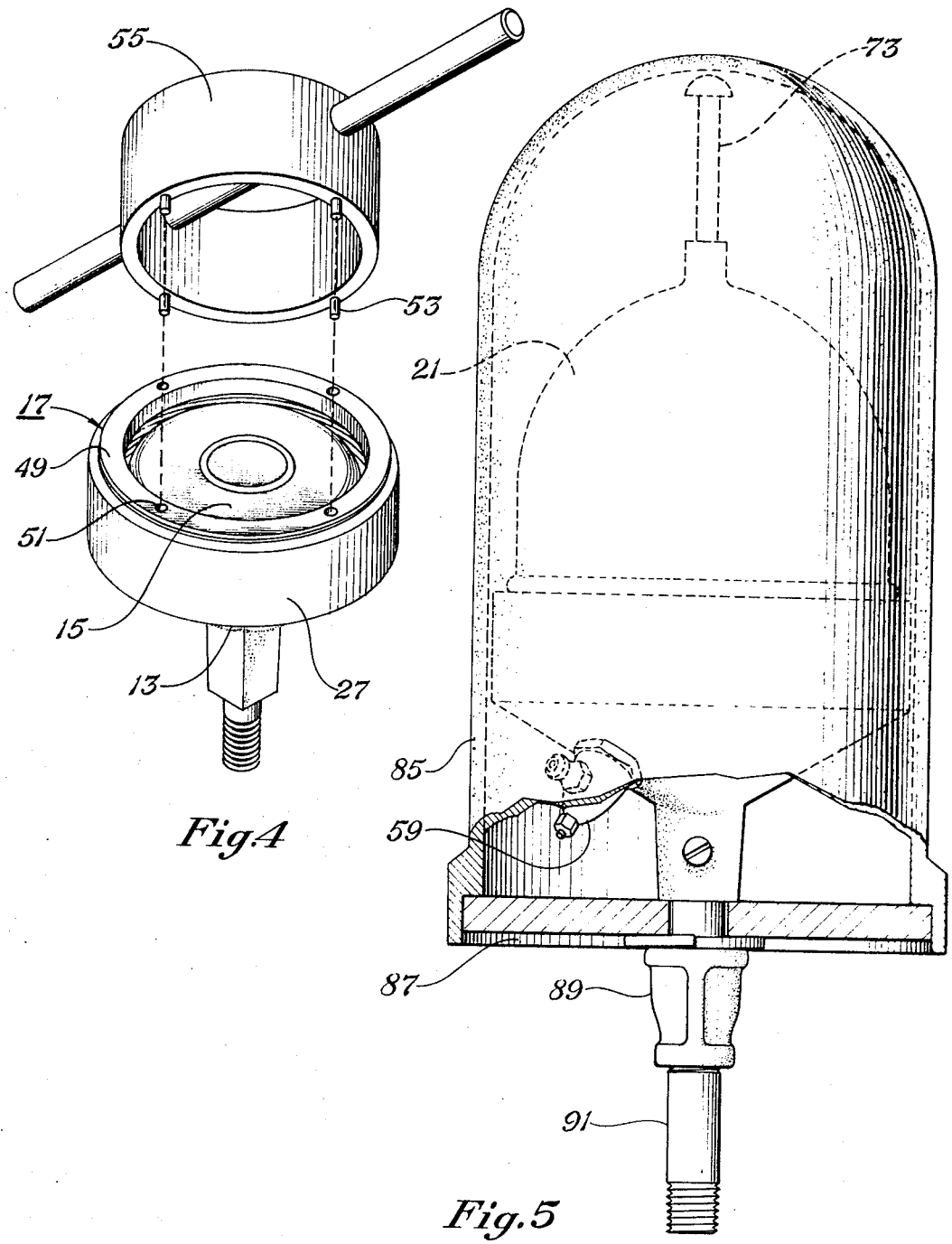

з,739,877

GREASE CUP

BACKGROUND OF THE INVENTION

1. Field of the Invention

This invention relates to lubricating devices, or grease cups; and, more particularly, to grease cups of a type wherein grease is fed automatically from a reservoir at a selected rate to an element, or part, to be lubricated.

2. Description of the Prior Art

A wide variety of grease cups have been developed in the prior art but the closest prior art of which I am aware is a grease cup disclosed and claimed in U.S. Pat. No. 2,985,256, issued May 23, 1961 to Malcolm J. Simmons and Joseph E. Hauser. While the grease cup disclosed therein has been widely useful, it has not been totally satisfactory in that it did not provide the following desirable features. In fact, insofar as I am aware, none of the prior art grease cups have provided the following desirable features:

1. means for grippingly retaining the diaphragm element in place within the grease cup and preventing its being blown out or ruptured, particularly when it is being filled by injection of grease thereinto;
2. control valve means that could be externally adjusted to adjust the grease flow rate without requiring removal of any portion of the lubricant device to get at an internally adjustable grease flow rate control valve means; and
3. means for protecting and making readily observable an indicator means indicating the degree of distension and hence of fill of the diaphragm element with the lubricant.

DESCRIPTION OF THE DRAWINGS

FIG. 1 is an isometric view of one embodiment of this invention.

FIG. 2 is a cross-sectional view of the embodiment of FIG. 1 with the diaphragm element not distended.

FIG. 3 is a partial cross-sectional view of the one way lubricant injection fitting and the adjustable relief valve of the embodiment of FIG. 2.

FIG. 4 illustrates the annular threaded ring, with its torqueing means, being screwed into the threads in the hollow housing of the embodiment of FIG. 2.

FIG. 5 illustrates a slip-off cover disposed about the housing and guard element in accordance with one embodiment of this invention.

DESCRIPTION OF THE PREFERRED EMBODIMENTS

It is an object of this invention to provide a lubricating device having one or more of the desirable features delineated hereinbefore and not provided by the prior art lubricating devices.

It is a specific object of this invention to provide a lubricating device having all of the desirable features delineated hereinbefore.

These and other objects will become apparent from the following descriptive matter particularly when taken in conjunction with the drawings.

The grease cup, or lubricating device, 11 shown in the drawings comprises hollow housing 13; diaphragm element such as diaphragm 15; retainer means 17 for retaining the diaphragm 15 in place; means 19 for preventing damage to the retained diaphragm that will adversely affect operation of the grease cup 11; guard element 21; and flow rate control screw 23.

As illustrated, the hollow housing 13 comprises a frusto-conical section 25 defining on its interior a tapered-cylindrical shape facilitating ejection of a lubricant, and a cylindrical section 27. The sections are co-axial. The frusto-conical section 25 has a threaded opening 29 inside for ultimately receiving a grease fitting 31. The grease fitting 31 is connected into the opening 29 by way of relief valve body 71, described later hereinafter. The grease fitting 31 is of a conventional type such as an alemite fitting, which will allow passage of grease under pressure into the reservoir but will not allow it to escape. The cylindrical section 27 has internally threaded walls that merge inwardly into an annular sealing shoulder 35 for receiving a peripheral sealing flange of a diaphragm. The annular sealing shoulder 35 has anti-slip means, such as concentric annular rings 37, for retaining in place a diaphragm flange pressed thereagainst.

The housing 13 has a connection means 39 for connecting the housing 13 with an element, such as a bearing or the like, to be lubricated. The connection means 39 defines a lubricant discharge passageway 41 traversing axially thereof. The lubricant discharge passage 41 communicates with the interior of the housing 13 so as to allow passage of the grease therethrough. As illustrated, the connection means 39 comprises threaded cylindrical section 43. Any other connection means may be employed as long as it is appropriate for connection with the element to be lubricated.

The diaphragm 15 is a distensible elastic element formed of non-metallic, lubricant-resistant material that terminates in a peripheral sealing flange 45 that seats on the annular sealing shoulder 35. Specifically, the diaphragm 15 is made of tough resilient material; such as, the synthetic rubbers like Neoprene or Buna-N. The diaphragm 15 must distend sufficiently for the injection of the desired amount of grease. To facilitate such distension, the diaphragm element may have concentric ribs and grooves, as described in the aforementioned U.S. Pat. No. 2,985,256, or it may simply have sufficient elasticity to be expanded when filled with grease and employ the force of its elasticity as it contracts to the position illustrated in FIG. 2 to inject the grease from the grease cup 11.

The retainer means 17 comprises an annular threaded ring 49, FIGS. 2 and 4. The annular threaded ring has torque-ing means such as the apertures 51 for screwing the annular threaded ring 49 inwardly to increase the compression force on the peripheral sealing flange 45 of the diaphragm 15. As illustrated, the threaded annular ring 49 may be screwed inwardly through engagement of the protruding shafts 53 of a special wrench 55 with the apertures 51. Other suitable torqueing means; such as, protruding shafts on ring 49; that are engageable with recess means of a wrench; may be employed if desired. The apertures 51 are advantageous, however, in that they do not interfere with subsequent screwing inwardly of a guard element 21, as illustrated in FIG. 2. The annular ring 49 can be screwed inwardly as tightly as necessary to effect the desired compressive force on the peripheral sealing flange 45, independently of the distance that the guard element 21 is screwed inwardly. Any material may be employed as the annular ring 49 as long as it has the requisite structural strength to impart the desired compressive force in response to being screwed inwardly. Ordinarily, metallic rings will be employed as the annular threaded ring 49.

An annular washer 57 is interposed intermediate the peripheral sealing flange 45 and the annular threaded ring 49 to alleviate problems with wear of the peripheral sealing flange in response to simultaneous compressive and rotational force of the annular threaded ring 49. The annular washer 57 may comprise a thin metallic washer for compressively retaining the peripheral sealing flange 45 against the sealing shoulder 35 in response to inward force by the annular threaded ring 49. If desired, other materials of construction that will sustain the requisite force may be employed as the washer 57.

The means 19 for preventing damage to the retained diaphragm 15 comprises the anti-slip means on the annular shoulders 35 and the relief valve 59. The anti-slip means are illustrated by the concentric annular rings 37. They maintain the peripheral sealing flange 45 in place, between the annular threaded ring 49 and washer 57 on one side and the annular shoulder 35 on the other, against a predetermined force that is dependent on the tightness with which annular ring 49 is screwed inwardly.

The diaphragm 15 is chosen to withstand a pressure greater than the predetermined pressure effecting the predetermined force tending to pull out the peripheral sealing flange 45. The relief valve 59 is set, however, to relieve at a pressure less than the predetermined pressure. Any of the conventional adjustable structures may be employed as the relief valve 59. As illustrated, the relief valve 59 comprises a bolt 61 having a threaded portion engaging nut 63 and having a biasing means, such as spring 65, for adjusting the pressure at which it relieves. The nut 63 has a poppet portion 67 on its backside for sealingly engaging with a seat 69 on the relief valve body 71. Thus, the relief valve 59 may be set to relieve at a pressure less than that sufficient either to rupture the diaphragm 15 or to pull the peripheral sealing flange 45 from intermediate annular threaded ring 49 and the annular sealing shoulder 35.

The guard element 21 may comprise any rigid structure extending outwardly from the housing a distance sufficient to enclose, at least laterally, and protect the diaphragm 15 even when the latter is fully distended under the pressure of contained lubricant. For example, the cylindrical structure disclosed in the aforementioned U.S. Pat. No. 2,985,256 may be employed. Preferably, the guard element 21 has indicator means for indicating the degree of distension and degree of fill of the diaphragm with lubricant. For example, the indicator means may comprise apertures in a cylindrical guard element such as described in the aforementioned U.S. Pat. No. 2,985,256. Preferably, however, the guard element 21 comprises a translucent dome through which the degree of distension of the diaphragm 15 can be seen. To alleviate any problems with being able to see through the translucent dome 21, however, a backup indicator means may be employed. The backup indicator means may take the illustrated form of bradded shaft 73 that is biased inwardly, as by spring 75. The bradded shaft 73 contains a washer 77; which may be retained in place, for example, by a C-clamp; holding the spring 75 in position to bias the bradded shaft into a retracted position in normal repose, as illustrated in FIG. 2. On the other hand, when the diaphragm 15 is distended, as illustrated in FIG. 1, the bradded shaft 73 extends upwardly to afford an indication of the degree of distension. The bradded shaft 73 exposes its maximum length for maximum distension, and zero length for a refill indication. If the bradded shaft 73 is employed as an indicator means, the dome 21 may be opaque if desired.

If desired, the guard element 21 may be carried by the housing 13. Preferably and as illustrated, the guard element 21 has a threaded base portion 79 having external threads 81 for mating with the internal threads of the cylindrical section 27 of the housing 13. It is noteworthy, however, that the threaded section 79 is so short in length that it does not encounter the threaded annular ring 49 such that the guard element 21 may be screwed into the housing 13 a desired distance without encountering the threaded annular ring 49. Moreover, the guard element 21 may be made of a light weight inexpensive material, since it does not have to supply or sustain the requisite compressive force to frictionally retain the peripheral sealing flange 45 against the annular sealing shoulder 35. If desired, the guard element 21 may comprise a slip-off cover 85, FIG. 5. Such a slip-off cover will be carried by a base structure 87. The base structure is carried by a threaded coupling 89 receiving the threaded section 43 of the housing 13 and being connected with the element to be lubricated by way of nipple 91. The slip-off cover 85 may be slipped from the base structure 87 to facilitate visual inspection of the indicator means, in the form of either the bradded shaft 73 or the translucent dome 21. As illustrated in FIG. 5, the cover 85 is employed in addition to the guard element 21. Where the slip-off cover is employed, however, it is not vital that the separate guard element 21 be employed, if the slip-off cover 85 protects the diaphragm 15 sufficiently.

The flow rate control screw 23 serves as a lubricant flow rate control valve. Any adjustable valve structure that will satisfactorily regulate the flow of the lubricant may be employed. The illustrated flow rate control screw 23 has a poppet 93 disposed at its inner end for sealing against seat 95 or being disposed a predetermined distance therefrom to regulate the flow of lubricant through the passageway 41. The flow rate control screw 23 threadedly engages the threaded aperture 97. The poppet 93 is moved inwardly or outwardly in response to rotation of the screw 23, as by way of slotted head 99, to regulate the flow of lubricant.

In assembly, the diaphragm 15 is inserted in the housing 13 with its peripheral sealing flange 45 seated on the sealing shoulder 35; then the annular threaded ring 49 is screwed into the internal threads of the cylindrical section 27 of the housing 13, on top of washer 57 to effect the necessary compression on and frictional retention of the peripheral sealing flange 45. The translucent dome 21 is screwed into place, carrying its inwardly biased bradded shaft 73. The relief valve body 71, carrying its alemite fitting 31 and its relief valve 59, is screwed into threaded aperture 29.

In operation, before initial mounting of the grease cup onto the element to be lubricated, the flow rate control screw 23 is turned to the grease cut-off position. The grease cup is then loaded with grease from a gun under pressure by way of the grease fitting 31. As the grease cup 11 is loaded, the diaphragm 15 expands until it reaches approximately the position indicated in FIG. 1, or the desired degree of distension of the diaphragm 15. After loading, the grease in the cup is under pressure exerted by the resilient diaphragm 15. The grease cup 11 is attached to the element by screwing the threaded section 43 into a cooperating receptacle of the element to be lubricated, as indicated. The externally adjustable flow rate control screw 23 is adjusted, as by screw driver inserted in slotted head 99, to effect the desired flow of lubricant by way of passageway 41. The rate of flow is readily adjusted to the desired rate; screwing inwardly on flow rate control screw 23 to restrict the flow or turning outwardly, or unscrewing, the flow rate control screw 23 to increase the rate of flow. Thereafter, the cup reservoir is simply reloaded as required. The need for reloading is readily ascertainable by one or more of the indicator means; such as, the translucent guard element 21 or the longitudinally movable bradded shaft 73. In cases where the grease cup 11 is to be used to lubricate a sealed bearing, the flow rate control screw is not necessary and may be omitted or backed off to allow full flow therethrough.

If the slip-on cover 85 is employed to help prevent damage to either the indicator means or the translucent dome 21; as by deterioration from the sunlight, accumulation of dirt or the like; it is simply mounted on a suitable base portion, as described hereinbefore such that it can be readily lifted therefrom to inspect the grease cup 11.

From the foregoing descriptive matter, it can be seen that this invention provides a grease cup that is simple in structure, devoid of complex mechanisms, yet very effective in its operation; also providing one or more of the desirable features not heretofore provided. The level of grease in the cup may be ascertained at a glance. It is an important advantage that the diaphragm may extend freely, and contain the grease under the requisite pressure. Because of the means for preventing damage, the controlled filling will not rupture the diaphragm or damage the lubricating device; thereby affording important protection for the grease cup and the element to be lubricated. Specifically, it can be seen that the invention provides the objects delineated hereinbefore and obviates the disadvantages of the prior art lubrication devices.

Materials of construction ordinarily employed in this art may be employed herein and no exotic new materials are necessary.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A lubricating device for automatically feeding lubricant from a reservoir to an element such as a bearing or the like, comprising:

a. a hollow housing having a one-way lubricant injection fitting positioned in a wall thereof; having connection means for connecting said housing with said element, said connection means defining an axial lubricant discharge passageway communicating with the interior of said housing; said housing including an axial cylindrical internally threaded wall merging inwardly into an annular sealing shoulder;
   b. a distensible elastic diaphragm element formed of a non-metallic, lubricant-resistant material terminating in a peripheral sealing flange seated on said annular sealing shoulder; said annular sealing shoulder incorporating anti-slip means to aid in retaining in place said sealing flange on said diaphragm element;
   c. annular threaded ring threadedly engaging said internal threaded wall and affecting compression retention of said peripheral sealing flange intermediate said annular threaded ring and said annular sealing shoulder, said annular threaded ring having torqueing means for screwing said annular ring inwardly to increase the compression on said peripheral sealing flange independently of any guard element;
   d. an annular washer interposed intermediate said peripheral sealing flange of said diaphragm element and said annular threaded ring to alleviate problems of distortion and wearing of said peripheral sealing flange responsive to simultaneous compressive and rotational forces of said annular threaded ring; and
   e. a rigid guard element disposed about said diaphragm element and extending outwardly from said housing a distance sufficient to enclose, at least laterally, and protect said diaphragm element even when the latter is fully distended under the pressure of contained lubricant.

2. The lubricating device of claim 1 wherein said guard element has a threaded base portion conformingly fitting the internally threaded wall of said housing, said threaded base portion being short enough such that it can be screwed interiorly of said housing independently of said annular threaded ring.

3. The lubricating device of claim 1 wherein said anti-slip means comprises annular concentric rings on the interior surface of said annular sealing shoulder.

4. The lubricating device of claim 1 wherein said rigid guard element is carried by said housing and has indicator means for indicating the degree of distension and hence of fill of said diaphragm element; and a cover is disposed about said rigid guard element for protection of said indicator means, said cover being liftable from around said lubricating device to facilitate inspection of said indicator means.

* * * * *